(12) United States Patent  (10) Patent No.: US 7,457,010 B2
Tehrani et al.  (45) Date of Patent: Nov. 25, 2008

(54) SYSTEM AND METHOD FOR FAST SCANNING

(75) Inventors: Justin A. Tehrani, Broomfield, CO (US); Scott C. Baggs, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 10/446,947

(22) Filed: May 29, 2003

(65) Prior Publication Data

US 2004/0240001 A1 Dec. 2, 2004

(51) Int. Cl.
*H04N 1/04* (2006.01)
*H04N 1/40* (2006.01)

(52) U.S. Cl. ............... 358/487; 358/474; 358/488; 358/444

(58) Field of Classification Search ........ 358/488, 358/444, 474, 401, 486, 487; 382/206, 199
See application file for complete search history.

(56) References Cited

U.S. PATENT DOCUMENTS

| | | | |
|---|---|---|---|
| 5,402,252 A * | 3/1995 | Kojima | 358/486 |
| 5,719,404 A | 2/1998 | Tsai et al. | |
| 5,901,253 A * | 5/1999 | Tretter | 382/289 |
| 5,929,435 A | 7/1999 | Han | |
| 5,987,270 A | 11/1999 | Hulan | |
| 6,008,501 A | 12/1999 | Pan | |
| 6,011,635 A | 1/2000 | Bungo et al. | |
| 6,081,628 A | 6/2000 | Lee | |
| 6,115,130 A | 9/2000 | On | |
| 6,134,027 A | 10/2000 | Lee | |
| 6,208,431 B1 | 3/2001 | Lee et al. | |
| 6,233,364 B1 | 5/2001 | Krainiouk et al. | |
| 6,259,540 B1 | 7/2001 | Hsu et al. | |
| 6,295,143 B1 | 9/2001 | Lee et al. | |
| 6,366,367 B1 | 4/2002 | Schreier et al. | |
| 6,376,834 B1 | 4/2002 | Hastings et al. | |
| 6,377,703 B1 | 4/2002 | Yeung | |
| 6,437,358 B1 | 8/2002 | Potucek et al. | |
| 6,453,080 B1 * | 9/2002 | Kao | 382/312 |
| 6,466,340 B1 * | 10/2002 | Washio | 358/488 |
| 6,470,099 B1 | 10/2002 | Dowdy et al. | |
| 6,473,206 B1 | 10/2002 | Fujimoto et al. | |
| 6,563,610 B1 * | 5/2003 | Wakui | 358/487 |
| 6,563,928 B1 | 5/2003 | Vanstone et al. | |
| 6,636,649 B1 * | 10/2003 | Murata et al. | 382/295 |
| 6,791,723 B1 * | 9/2004 | Vallmajo et al. | 358/488 |
| 6,888,650 B1 * | 5/2005 | Mizubata et al. | 358/488 |
| 6,956,587 B1 * | 10/2005 | Anson | 345/649 |
| 7,206,104 B2 * | 4/2007 | Lee | 358/488 |
| 2001/0022675 A1 | 9/2001 | Kelly et al. | |
| 2002/0109867 A1 | 8/2002 | Sesek et al. | |
| 2002/0126899 A1 | 9/2002 | Farrell | |
| 2002/0159097 A1 | 10/2002 | Shih et al. | |

FOREIGN PATENT DOCUMENTS

DE 10039396 9/2001
WO WO98/31135 7/1998

* cited by examiner

*Primary Examiner*—Houshang Safaipour

(57) ABSTRACT

In accordance with an embodiment of the present invention, a method for scanning an object by an image capture device comprises automatically detecting a starting end of the object to be scanned, scanning the object from the starting end and automatically terminating the scanning of the object in response to detection of a terminating end of the object.

14 Claims, 3 Drawing Sheets

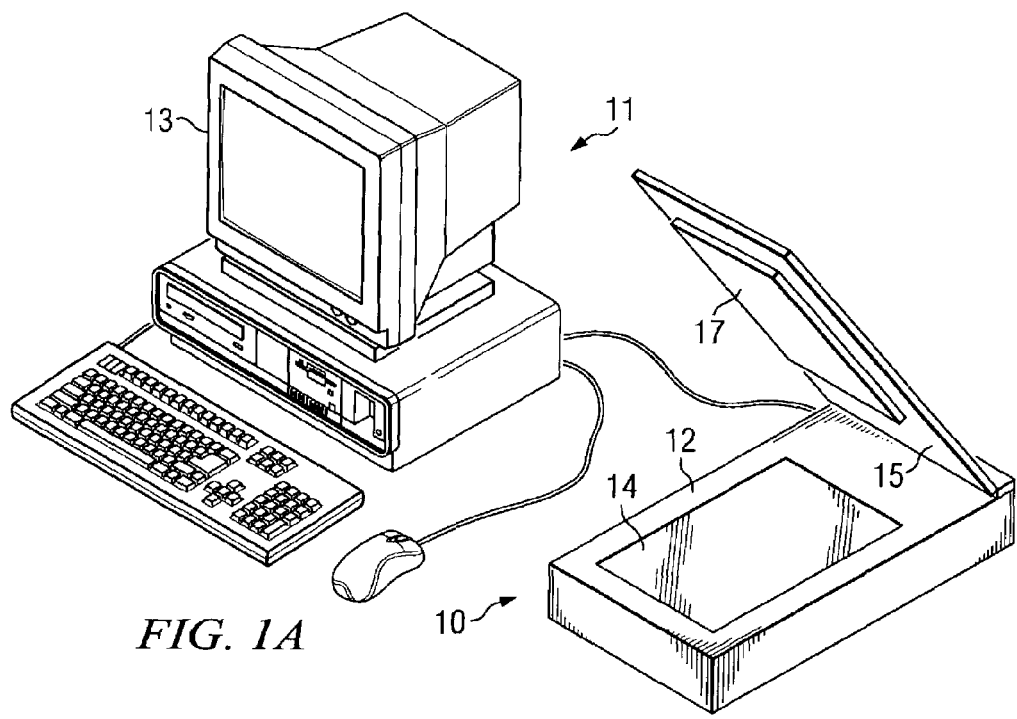
FIG. 1A
FIG. 2
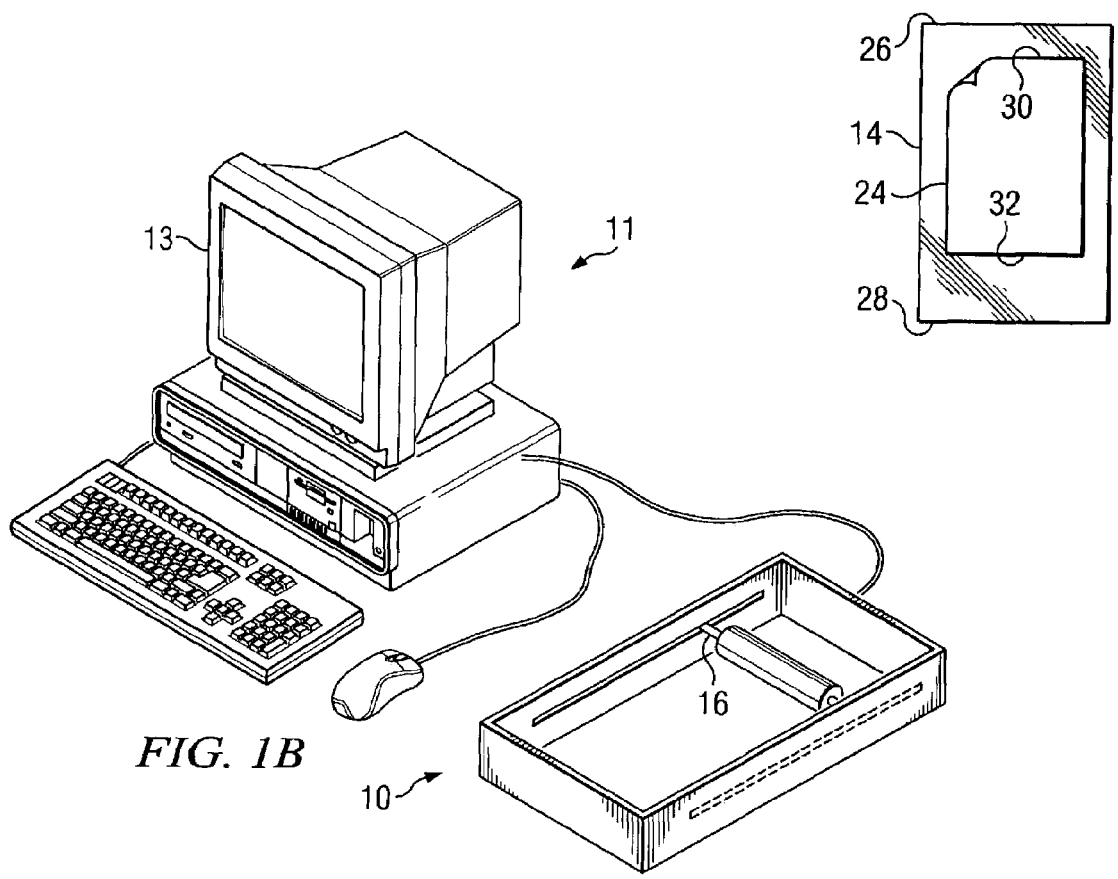
FIG. 1B

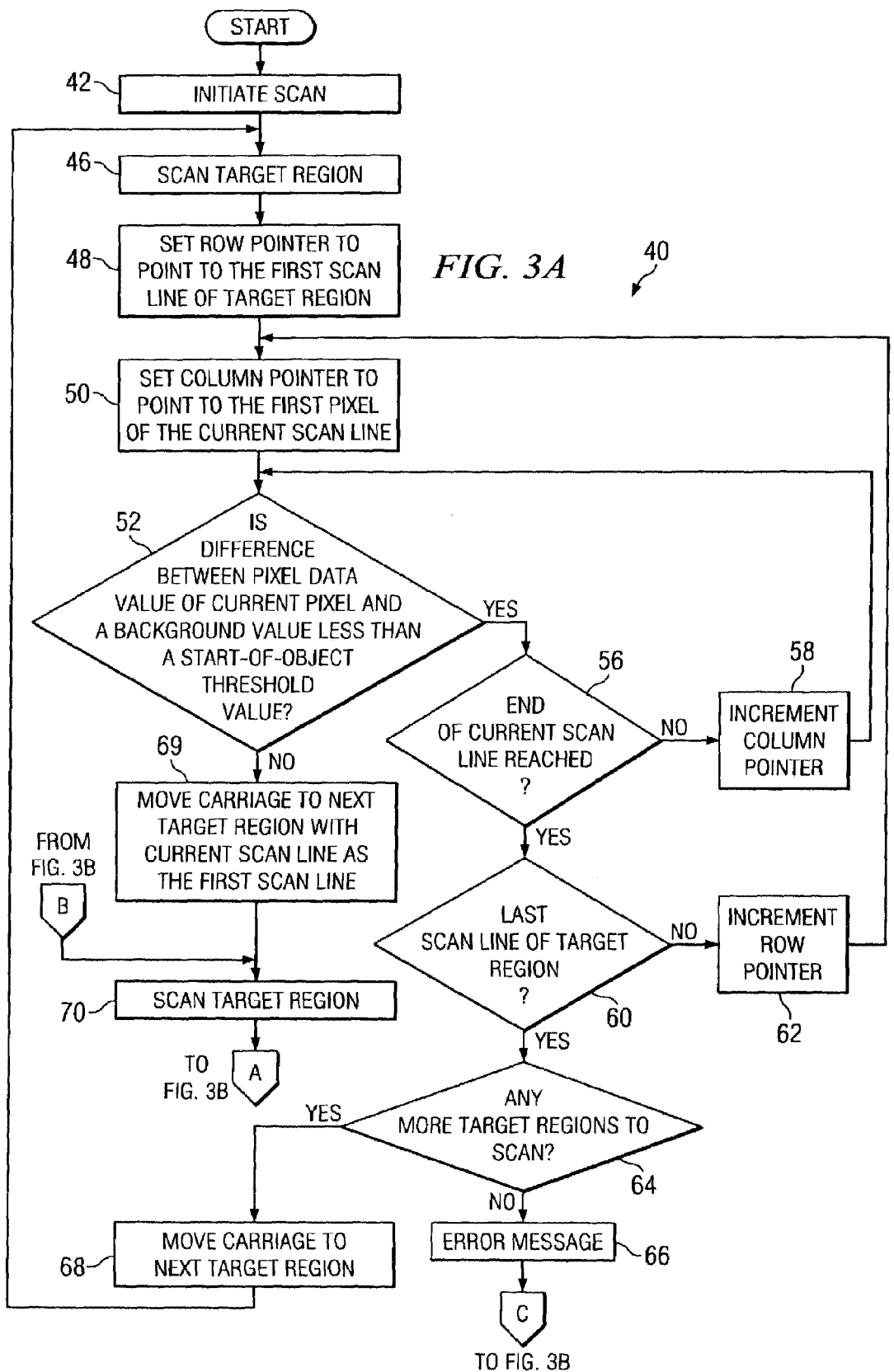

SYSTEM AND METHOD FOR FAST SCANNING

TECHNICAL FIELD OF THE INVENTION

The present invention relates generally to the field of image capture devices, and more particularly to a system and method for fast scanning.

BACKGROUND OF THE INVENTION

The use of scanners has substantially increased over the years. Scanners are increasingly used to scan different kinds of objects, such as documents, photographs, negatives, transparencies and/or the like. However, the speed of scanning has not kept pace with the increase in the use of scanners. Typically it takes a substantial amount of time to scan object. The scan time varies depending on the type of object being scanned, the size of the object being scanned, and the resolution at which an object is being scanned.

SUMMARY OF THE INVENTION

In accordance with an embodiment of the present invention, a method for scanning an object by an image capture device comprises automatically detecting a starting end of the object to be scanned, scanning the object from the starting end and automatically terminating the scanning of the object in response to detection of a terminating end of the object.

In accordance with another embodiment of the present invention, a system for scanning an object comprises an image capture device and application logic operatively associated with the image capture device and operable to: automatically detect a starting end of the object to be scanned, perform a scan of the object from the starting end and automatically terminate the scan of the object in response to detection of a terminating end of the object.

BRIEF DESCRIPTION OF THE DRAWINGS

For a more complete understanding of the present invention, the objects and advantages thereof, reference is now made to the following descriptions taken in connection with the accompanying drawings in which:

FIGS. 1A and 1B are perspective views of an exemplary image capture device which may use embodiments of the present invention to advantage;

FIG. 2 is a top plan view of a platen of a scanner illustrating a scanning operation; and FIGS. 3A and 3B are a flowchart of a scanning method in accordance with an embodiment of the present invention.

DETAILED DESCRIPTION OF THE DRAWINGS

Figure 3B:
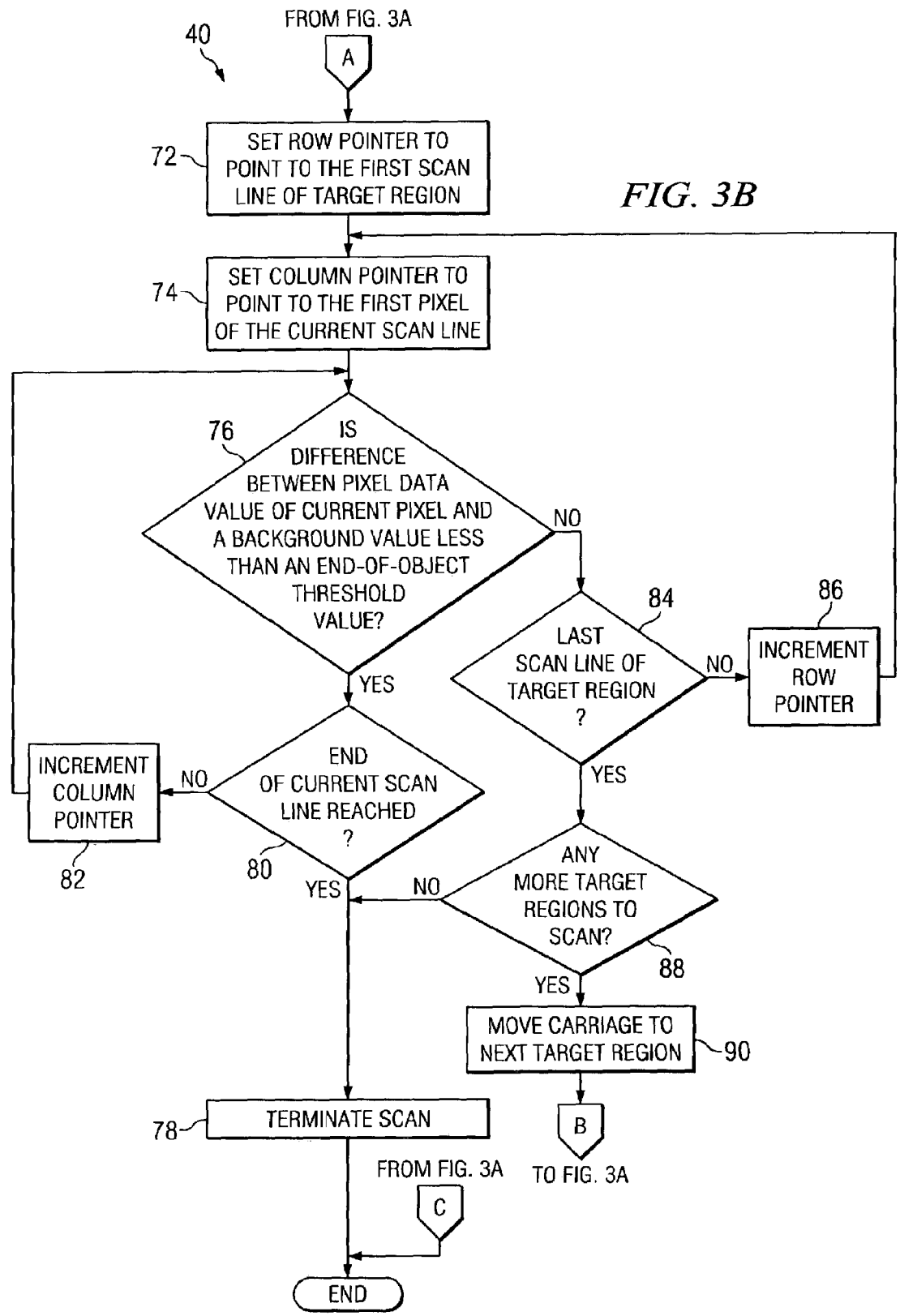

The preferred embodiment of the present invention and its advantages are best understood by referring to FIGS. 1 through 3B of the drawings, like numerals being used for like and corresponding parts of the various drawings.

The present invention will be described herein with reference to an image capture device, such as a scanner. The teachings of the present invention may be used with respect to other types of image capture devices, such as photocopiers, facsimile machines, printers, and/or the like.

FIG. 1A is a perspective view of an exemplary image capture device 10 in the form of a scanner, such as a flatbed scanner, and FIG. 1B is a perspective view of flatbed scanner 10 with a top cover 12 removed. If desired, image capture device 10 may instead be part of a multi-function device, a copier, a facsimile machine, or another machine that generates a digital image for storage, transmission or further processing. The terms "image capture device", "flatbed scanner", and "scanner" are used interchangeably herein. Scanner 10 includes a platen 14 against which an object 24 (FIG. 2) to be scanned, such as a document, a photograph, a negative, a transparency, and/or the like, may be placed. Scanner 10 may comprise a lid 15 to cover platen 14 and object 24 placed thereon. Lid 15 may have a reflector 17 on the side facing platen 14. Scanner 10 may be coupled to a computer system 11 to facilitate control and operation of scanner 10. If desired, in an alternative embodiment, scanner 10 may comprise an automatic document feeder (ADF) or an automatic photo feeder (APF). The ADF or APF is typically used to automatically feed a plurality of objects 24 to scanner 10 for scanning, although they may be used to feed a single object to scanner 10.

FIG. 2 is a top plan view of platen 14 of scanner 10 illustrating a scanning operation. As shown in FIG. 2, object 24 to be scanned is placed on platen 14 of scanner 10. Object 24 comprises a first or starting end 30 and a second or terminating end 32.

A typical scanning operation involves two separate scans, a preview scan and a final scan. After the user initiates a scanning operation, a preview scan is performed by scanner 10. During the preview scan, a carriage 16 moves from a home position 26 towards an end position 28 scanning object 24 at a low resolution. During or after the preview scan, the user can select and set the values of various parameters, such as resolution of the scan, color, scan area, exposure and/or the like for the final scan. The final scan may then be performed. During the final scan, the object is scanned based at least in part on the selected parameters, for example at the selected resolution, to provide the final digital image.

In existing systems, during the preview scan, carriage 16 moves from home position 26 to end position 28 scanning the entire surface of platen 14 from home position 26 to end position 28 irrespective of the size of object 24 to be scanned. Thus, if the length of object 24 is less than platen 14, as is frequently the case, then carriage 16 unnecessarily moves from terminating end 32 of object 24 to end position 28 of platen 14 scanning the portion of platen 14 beyond terminating end 32 of object 24. This unnecessarily slows down the scanning process and also wastes resources of both scanner 10 and computer system 11. Furthermore, it causes unnecessary mechanical wear of the parts of scanner 10.

Accordingly, there is a desire for a system and method for terminating a scanning operation upon detection of terminating end 32 of object 24. There is also a desire for a system and method for beginning a scanning operation upon detection of starting end 30 of object 24. In accordance with an embodiment of the present invention, terminating end 32 of object 24 is determined by comparing pixel data values of pixels in a target region with background pixel values. If the absolute difference is less than an end-of-object threshold value for all pixels in a particular scan line, then the scanning operation is terminated.

FIGS. 3A and 3B are a flowchart of a scanning method 40 in accordance with an embodiment of the present invention. Method 40 is preferably executed when an automatic detection feature is enabled either on scanner 10 or on software associated with computer system 11. Preferably, the automatic detection feature is the default feature. If desired, the automatic detection feature may be disabled or enabled via a graphical user interface associated with computer system 11.

Method 40 is especially advantageous during the preview scan but may also be used during the final scan.

In block 42, a scan, for example a preview scan or a final scan, is initiated preferably from home position 26 of platen 14. The user may inadvertently place object 24 on platen 14 in such a manner that first end 30 of object 24 does not correspond to home position 26. Thus, it may be desirable to detect first end 30 of object 24 so that scanned data associated with the portion of platen 14 that is between home position 26 and first end 30 of object 24 is not unnecessarily processed. Blocks 46, 48, 50, 52, 56, 58, 60, 62, 64, 68 of method 40 may be used to detect first end 30 of object 24.

In block 46, a target region is scanned. The target region may be any area on the surface of object 24 or platen 14. Preferably, the target region comprises more than one scan line. Alternatively, the target region may comprise one scan line. Preferably, the target regions are contiguous, although if desired they may be non-contiguous. In order to determine whether the target region scanned in block 46 comprises at least a portion of object 24, it is desirable to perform a comparison of pixel data values obtained in block 46 to at least one background value.

The background value may be the pixel data value of a pixel obtained when a scan is performed without any object on platen 14. When reflector 17 on scanner lid 15 is of uniform color and pattern, the background value is preferably the same for all pixels. On the other hand, if reflector 17 is of non-uniform color or pattern, then the background value is preferably different for different pixels. In the latter embodiment, a template or mask providing scanned pixel data values for lid 15, reflector 17, and/or the like, may be created preferably prior to block 42. The mask may be created, for example by scanning the side of lid 15 and/or reflector 17 facing platen 14 without any object on platen 14. The mask may be created either by the manufacturer of scanner 10 or by the user. The mask may be stored in scanner 10 or in computer system 11. In such an embodiment, the background value for the current pixel is preferably the pixel data value for the corresponding pixel in the mask.

In block 48, a row pointer which points to a current scan line is set to point to the first scan line of the target region. In block 50, a column pointer is set to point to the first pixel of the current scan line. In block 52, a determination is made as to whether the absolute value of the difference in the pixel data value of the current pixel pointed to by the row pointer and the column pointer and at least one background value is less than a start-of-object threshold value. If desired, in an alternative embodiment, a determination may be made as to whether the absolute value of the difference in the pixel data value of the current pixel pointed to by the row pointer and the column pointer and at least one background value is more than a start-of-object threshold value. The start-of-object threshold value is a predefined threshold value and may be user configurable. The background value may be used in determining whether first end 30 of object 24 has been detected or not.

In an exemplary embodiment, an absolute value of the difference that is not less than the start-of-object threshold value, indicates that the current pixel is part of object 24 placed against platen 14. This in turn indicates that first end 30 of object 24 has been detected and the process starting at block 69 to perform the scan of object 24 and detecting terminating end 32 of object 24 may be executed.

If in block 52, it is determined that the absolute value of the difference between the pixel data value of the current pixel and the background value is less than the start-of-object threshold value, then in block 56, a determination is made as to whether the end of the current scan line has been reached. If the end of the current scan line has not been reached, then in block 58, the column pointer is incremented to point to the next pixel of the current scan line. The process starting at block 52 may then be executed.

If in block 56 it is determined that the end of the current scan line has been reached, then in block 60, a determination is made as to whether the current scan line is the last scan line of the target region. If the current scan line is not the last scan line of the target region, then in block 62, the row pointer is incremented to point to the next scan line of the target region. The process starting at block 50 to set the column pointer to point to the first pixel of the current scan line may then be executed.

If in block 60 it is determined that the current scan line is the last scan line of the target region, then in block 64 a determination is made as to whether there are any more target regions to be scanned. If there are no more target regions to be scanned, then in block 66 an error message may be displayed on a monitor 13 associated with computer system 11 indicating that there is no object to be scanned on platen 14. Thereafter, the process terminates. If there are additional target regions to be scanned, then in block 68, carriage 16 is moved to the next target region comprising of at least one scan line and the process starting at block 46 for scanning the next target region may be executed.

If in block 52 it is determined that the absolute value of the difference between the pixel data value of the current pixel and the background value is not less than the start-of-object threshold value, then it is assumed that starting end 30 of object 24 has been detected.

In block 69, carriage 16 is moved to a new target region having the current scan line as the first scan line. In block 70, the target region is scanned. The pixel data values obtained during scanning of the target region may be used to create at least a portion of the image of the object. In order to determine whether at least a portion of object 24 is part of the target region scanned, it is desirable to perform a comparison of pixel data values obtained in block 70 to at least one background value. As such, in block 72, the row pointer is set to point to the first scan line of the target region. In block 74, the column pointer is set to point to the first pixel of the current scan line.

In block 76, a determination is made as to whether the absolute value of the difference in the pixel data value of the current pixel pointed to by the row pointer and the column pointer and at least one background value is less than an end-of-object threshold value. The end-of-object threshold value is a predefined value and may be user configurable. Preferably, the end-of-object threshold value is the same as the start-of-object threshold value.

In an exemplary embodiment, an absolute value of the difference that is not less than the end-of-object threshold value indicates that the current pixel is part of object 24 placed on platen 14. This in turn indicates that terminating end 32 of object 24 has not been detected. However, the processing of the remaining pixels of the current scan line to detect terminating end 32 of object 24 may be skipped and the process starting at block 84 may be executed.

In block 84, a determination is made as to whether the current scan line is the last scan line of the target region. If the current scan line is not the last scan line of the target region, then in block 86, the row pointer is incremented to point to the next scan line of the target region. The process starting at block 74 to set the column pointer to point to the first pixel of the current scan line may then be executed.

If in block 84 it is determined that the current scan line is the last scan line of the target region, then in block 88 a determination is made as to whether there are any more target regions to be scanned. If there are additional target regions to be scanned, then in block 90, carriage 16 is moved to the next target region and the process starting at block 70 for scanning the next target region may be executed. If there are no more target regions to be scanned that indicates that end position 28 has been reached. The scanning operation may then be terminated (block 78).

If in block 76, it is determined that the absolute value of the difference between the pixel data value of the current pixel and the background value is less than the end-of-object threshold value, then in block 80, a determination is made as to whether the end of the current scan line has been reached. If the end of the current scan line has not been reached, then in block 82, the column pointer is incremented to point to the next pixel of the current scan line. The process starting at block 76 may then be executed. If in block 80 it is determined that the end of the current scan line has been reached, then the scanning operation may be termination (block 78).

The present invention may be implemented in software, hardware, application logic or a combination of software, hardware and application logic. The software, application logic and/or hardware may reside on image capture device 10 or computer system 11. If desired, part of the software, application logic and/or hardware may reside on image capture device 10 and part of the software and/or hardware may reside on computer system 11.

If desired, the different functions discussed herein may be performed in any order and/or concurrently with each other. Furthermore, if desired, one or more of the above-described functions may be optional or may be combined without departing from the scope of the present invention.

The scope of the present invention is not limited to performing a comparison of pixel data values of individual pixels to a background value. If desired, pixel data values of a plurality of pixels may be used to perform the comparison with one or more background values. For example, an average pixel data value of a plurality of pixels scanned may be compared to one or more background values or a value obtained from one or more background values.

A technical advantage of an exemplary embodiment of the present invention is that unnecessary scanning of the portion of the platen without any object on it may be avoided. Another technical advantage of an exemplary embodiment of the present invention is that the starting end of the object placed on the platen may be detected. Another technical advantage of an exemplary embodiment of the present invention is that the terminating end of the object placed on the platen may be detected.

What is claimed is:

1. A method for scanning an object by an image capture device, comprising:
    scanning a line and determining whether a starting end of said object is included in the line scanned to automatically detect the starting end of said object, wherein scanning said line and determining said starting end of said object includes scanning a target region and comparing a pixel data value of at least one pixel of said target region with a background value to automatically detect said starting end of said object and wherein said background value is different for at least two of said at least one pixel of said target region;
    incrementally scanning additional lines from said starting end and determining during the scanning whether a terminating end of said object is detected; and
    automatically terminating said scanning of said object in response to detection of the terminating end of said object.

2. The method of claim 1, wherein said scanning said object comprises scanning said object from said starting end in response to automatic detection of said starting end.

3. The method of claim 1, where incrementally scanning additional lines further comprising:
    scanning a target region; and
    comparing a pixel data value of at least one pixel of said target region with a background value to automatically detect said terminating end of said object.

4. The method of claim 1, wherein said scanning is part of a preview scan of said object.

5. A method for scanning an object by an image capture device, comprising:
    scanning at least a portion of said object;
    comparing a pixel data value of at least one pixel of said at least a portion with a background value to automatically detect a terminating end of said object, wherein said comparing said pixel data value includes comparing a pixel data value of each of a plurality of pixels of said at least a portion of said object with said background value to automatically detect said terminating end of said object and wherein said background value is different for at least two of said plurality of pixels;
    continue scanning additional portions of said object if the terminating end is not detected; and
    automatically terminating said scanning of said object in response to detection of said terminating end of said object.

6. The method of claim 5, further comprising automatically detecting a starting end of said object.

7. The method of claim 5, wherein said scanning at least a portion of said object comprises scanning said at least a portion of said object starting from a starting end of said object.

8. A system for scanning an object, comprising:
    an image capture device including a platen upon which an object is placed for scanning; and
    application logic operatively associated with said image capture device and operable to:
        scan incremental scan lines across the platen and automatically detect a starting end of said object during said scan;
        scan additional scan lines across the platen from said starting end and determine whether a scan line includes a terminating end of said object during said scan; and
        automatically terminate said scan of said object in response to detection of said terminating end of said object, wherein
        said application logic is further operable to compare a pixel data value of each of a plurality of pixels of said scan line with a background value to automatically detect said starting end of said object, and wherein said background value is different for at least two of said plurality of pixels of said target region.

9. The system of claim 8, wherein said scanning is part of a preview scan of said object and the application logic is configured to terminate said scan upon the detection of the terminating end of said object without scanning additional portions of the platen without said object.

10. The system of claim 8, said application logic further operable to perform said scan of said object from said starting end in response to automatic detection of said starting end.

11. The system of claim 8, said application logic further operable to:

compare a pixel data value of at least one pixel of said scan line with a background value to automatically detect said terminating end of said object.

12. An image capture device for scanning an object, comprising:

application logic operatively associated with said image capture device and operable to:

perform a scan of at least a portion of said object, and during the scan;

compare a pixel data value of at least one pixel of said at least a portion of said object with a background value to detect whether a terminating end of said object has been scanned; and automatically terminate said scan of said object in response to detection of said terminating end of said object, and continuing the scan if said terminating end has not been detected, wherein said application logic being further operable to compare a pixel data value of each of a plurality of pixels of said at least a portion of said object with said background value to automatically detect said terminating end of said object wherein said background value is different for at least two of said plurality of pixels.

13. The image capture device of claim 12, said application logic further operable to automatically detect a starting end of said object.

14. The image capture device of claim 12, said application logic further operable to perform a scan of said at least a portion of said object by incrementally scanning scan lines and detecting whether said terminating end of said object has been scanned at each of the scanned lines before continuing another incremental scan.

* * * * *